United States Patent Office.

JULIUS EDMUND DOTCH, OF WASHINGTON, DISTRICT OF COLUMBIA.

Letters Patent No. 93,183, dated August 3, 1869; antedated February 3, 1869.

IMPROVEMENT IN PRESERVING MEATS, POULTRY, FISH, &c.

The Schedule referred to in these Letters Patent and making part of the same.

*To all whom it may concern:*

Be it known that I, JULIUS EDMUND DOTCH, of the city of Washington, in the District of Columbia, have invented a new Process for Preserving Meats, Poultry, Oysters, Crabs, Lobsters, Fish, Vegetables, &c.; and I do hereby declare that the following is a full and exact description thereof.

The nature of my invention consists in using either aldehyde or formic ether or acid, in the gaseous or liquid state, or hyposulphite of soda, to absorb the oxygen contained in the blood and the water of the meat, and mixtures of glycerine with any of the following salts: Acetate and sulphate of alumina, phosphate of soda, nitrate of ammonia, strontium and nitrate of baryta, chlorate of potash, sulphate of soda and potash, sulphate of manganese, magnesia, ammoniacum, sulphite and hyposulphite of lime, magnesia, potash and soda, chloride of potassa, nitrate of potassa and soda, phosphate of ammonia, nitrate of lime, carbonate of potash and soda, phosphide of potassium, tartaric acid, chloride of sodium, acetate of soda, potash, ammonia, baryta, and lime; chlorate of ammonia, chlorate of calcium, acetic acid, phenic acid, chloride of manganese, rectified pyroligneous acid, phenate of soda, phenate of ammonia, sulphurous acid, and the formiates or formic acids.

If I want to preserve oysters, I use a solution of phosphate of soda, or hyposulphite of soda, lime, or magnesia, citric acid, borax, or some other of the above-named antiseptic salts or acids, aldehyde, formic acid, or ether, in carbonic-acid water, or water charged with carbonate-of-ammonia gas, or oxysulphide-of-carbon gas, with glycerine.

The meat I cover with paraffine and stearine, with tannin, or I use a wrapping-paper, saturated with paraffine, mixed with any of the above antiseptics, or saturated with pyroligneous acid, and sprinkle it over with wood-ashes alone, or sawdust or sand mixed with wood ashes.

If I transport the meat, &c., in air-tight vessels, I introduce carbonate-of-ammonia gas, or oxysulphide-of-carbon gas, (lately discovered by Mr. Thau—see Journal of Applied Chemistry, January, 1869,) or ozone, (prepared by any of the known methods,) or turpentine-vapors, into those vessels; or I kill the animal with electricity, and keep up in the barrels or vessels a continuous electric or galvanic current, (constant battery.)

What I claim as my invention, and desire to secure by Letters Patent, is—

The preserving of meats, oysters, fish, &c., by the use of the mixtures of glycerine with the above-named antiseptic salts, in connection with aldehyde, formic ether or acid, the solution of them in carbonic-acid water and glycerine, the covering with wrapping or parchment-paper, saturated with those solutions; the sprinkling with wood ashes; the introduction of carbonate-of-ammonia vapors, turpentine-vapors, oxysulphide-of-carbon gas, or ozone, and the use of paraffine and stearine, mixed with tannin; to kill the animal with electricity, and to keep up in the barrels or vessels a continuous electric or galvanic current, (constant battery.)

JULIUS EDMUND DOTCH.

Witnesses:
CHAS. L. COOMBS,
J. O. ERNI.